(12) United States Patent
Fan et al.

(10) Patent No.: US 9,705,376 B2
(45) Date of Patent: Jul. 11, 2017

(54) MOTOR ASSEMBLY

(71) Applicants: LEICONG INDUSTRIAL COMPANY LIMITED, Taoyuan County (TW); Yang-Fung Fan, Taipei (TW)

(72) Inventors: Yang-Fung Fan, Taipei (TW); Chao-Xi Chen, Taoyuan County (TW)

(73) Assignees: LEICONG INDUSTRIAL COMPANY LIMITED, Zhongli (TW); Yang-Fung Fan, Taipei (TW)

( * ) Notice: Subject to any disclaimer, the term of this patent is extended or adjusted under 35 U.S.C. 154(b) by 1064 days.

(21) Appl. No.: 13/917,281

(22) Filed: Jun. 13, 2013

(65) Prior Publication Data

US 2014/0001925 A1    Jan. 2, 2014

(30) Foreign Application Priority Data

Jun. 28, 2012 (TW) .............................. 101212451 U

(51) Int. Cl.
| | |
|---|---|
| H02K 5/00 | (2006.01) |
| H02K 5/15 | (2006.01) |
| H02K 1/14 | (2006.01) |
| H02K 1/18 | (2006.01) |

(52) U.S. Cl.
CPC ............... *H02K 5/15* (2013.01); *H02K 1/141* (2013.01); *H02K 1/185* (2013.01)

(58) Field of Classification Search
CPC .......... H02K 5/15; H02K 1/141; H02K 1/143; H02K 1/148

USPC .......... 310/401, 216.021, 216.022, 216.023, 310/216.024, 89, 90, 91, 400, 402
See application file for complete search history.

(56) References Cited

U.S. PATENT DOCUMENTS

| | | | | |
|---|---|---|---|---|
| 4,557,041 A | * | 12/1985 | White | ...................... H02K 5/15 228/165 |
| 4,801,831 A | * | 1/1989 | Lewis | ...................... H02K 5/04 310/89 |
| 2011/0043067 A1 | * | 2/2011 | Li | ..................... H02K 1/141 310/158 |
| 2012/0306297 A1 | * | 12/2012 | Kim | .................... H02K 19/103 310/46 |

* cited by examiner

*Primary Examiner* — Hanh Nguyen
(74) *Attorney, Agent, or Firm* — Muncy, Geissler, Olds & Lowe, P.C.

(57) ABSTRACT

A motor assembly includes two cap bodies, a stator body, a rotor body and a fixing mechanism. Each cap body has a bearing holder and a plurality of positioning portions radially extended from the bearing holder. Each bearing holder has a bearing received. A shaft passes through a center part of the rotor body, and two ends of the shaft sleeved in the two bearings respectively. The stator body has a plurality of stator units aligned around an outer periphery of the rotor body. Under this arrangement, the stator units of the stator body is axially sandwiched by the positioning portions of the two cap bodies, and the stator body and the two cap bodies are fixed together via the fixing mechanism. The motor assembly simplifies the coil winding procedure for the stator body, so that the manufacturing costs of the stator body and the motor assembly are significantly reduced.

15 Claims, 16 Drawing Sheets

MOTOR ASSEMBLY

CROSS-REFERENCES TO RELATED APPLICATIONS

This non-provisional application claims priority under 35 U.S.C. 119(a) on Patent Application No. 101212451 filed in Taiwan, R.O.C. on Jun. 28, 2012, the entire contents of which are hereby incorporated by reference.

BACKGROUND OF THE INVENTION

Technical Field

The present invention relates to a motor assembly, and particularly to an innovation structure of a motor assembly for a switched-reluctance motor or a brushless DC motor.

Related Art

The numbers of slots and poles of a stator body for a conventional motor is designated based on the required volume, the rotation speed and other specification of the conventional motor, so that the stator body is manufactured according to the numbers of the slots and the poles. Traditionally, a plurality of magnetic conducting plates (or silicon steel plates), is stacked and riveted together so as to form a conventional stator body. An iron core of the conventional stator body has a plurality of teeth portions, a plurality of slot holes and a hollow slot ring. However, during manufacturing the conventional stator body, a lot of waste material will result from production of the slot holes. In addition, it is difficult to wind coils on the conventional stator body, so motor manufacturers must purchase coil winding machines and coil forming machines, which are expensive. Additionally, the flexibility for designing the conventional stator body is poor, so that when the number of the poles (the S poles and the N poles), of the stator body is increased, the coil winding procedure will be much more difficult and the coil circles on the stator body are also reduced.

Furthermore, within the conventional motor, the conventional stator body is received by a covering shell, so the stability of the conventional stator body is not sufficient. Upon using the conventional motor for a period, noise will result from instability of the conventional stator body.

SUMMARY

In view of this, the present invention proposes an innovation structure of a motor assembly for switched-reluctance of brushless DC motor, so the coil winding procedure of the stator body becomes simpler and faster, and the assembling procedure of the motor assembly is also simplified, reducing the motor product cost to the market. The motor assembly of the present invention has a first cap body, a second cap body, a rotor body, a stator body and a fixing mechanism. The first cap body has a first bearing holder and a plurality of first positioning portions radially extended from the first bearing holder. A first bearing is received in the first bearing holder.

The second cap body has a second bearing holder and a plurality of second positioning portions radially extended from the second bearing holder. A second bearing is received in the second bearing holder.

The rotor body has a shaft passing through a center part thereof, and two ends of the shaft sleeved in the first bearing and the second bearing respectively. The stator body has a plurality of stator units aligned around an outer periphery of the rotor body and a plurality of coils winded on the stator units respectively. Each stator unit has two feet and a connecting portion connecting to the two feet and is formed as U-shaped. Each stator unit has at least one through hole opened thereon. The stator units are axially sandwiched between first positioning portions and second positioning portions.

The fixing mechanism axially fixes the first cap body, the stator body and the second cap body.

Consequently, the coil winding procedure of the stator body is simpler and faster than that in prior arts. In addition, the assembling procedure of the motor assembly is also simple and the components inside the assembled product are positioned stably.

A first blocker and a second blocker is axially extruded from each first positioning portion and each second positioning portion respectively, so that each stator unit is confined in two adjacent blockers and the stability of the stator body is improved such that the motor assembly operates stably. In one embodiment, the blockers can be extruded from the first positioning portions or the second positioning portions so as to provide the positioning function for the stator body.

The motor assembly has a circuit board axially sandwiched between the stator body and the first cap body, and the circuit board is electrically connected to the coils. The circuit board has a plurality of extruding portions exposed out of the first positioning portions, so that a power supply source is connected to the circuit board conveniently.

The first cap body and the second cap body have a first outer wall and a second outer wall respectively axially extended from the first cap body and the second cap body, so that the first cap body and the second cap body are formed in a bowl shape. The first outer wall and the second outer wall are combined so as to enclose the stator body.

In some embodiments, the first cap body and the second cap body are diamond-shaped. In some embodiments, the first cap body and the second cap body are cross-shaped. In one embodiment, a plurality of silicon steel plates is axially stacked so as to form the stator unit. In another embodiment, each stator unit is integrally formed as one piece.

In some embodiments, each stator unit is a component integrally formed by the two feet and the connecting portion. In some embodiments, each stator unit is composed of at least two separated sub units, and the sub units are combined together via the feet and the connecting portion.

In one embodiment, the fixing mechanism is a plurality of fixing members such as bolts, so that the bolts pass through the second positioning portions and the stator units so as to lock into the first positioning portions respectively when a threaded feature is defined in each first positioning portion. In one embodiment, the bolts also pass through the first positioning portions so as to thread with a plurality of nuts respectively. Under this arrangement, the fixing mechanism securely and axially fixes the first cap body, the stator body and the second cap body. In some embodiments, the fixing mechanism can be a plurality of rivets or other fastening components.

The motor assembly of e present invention is applicable to a switched-reluctance motor or a brushless motor.

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
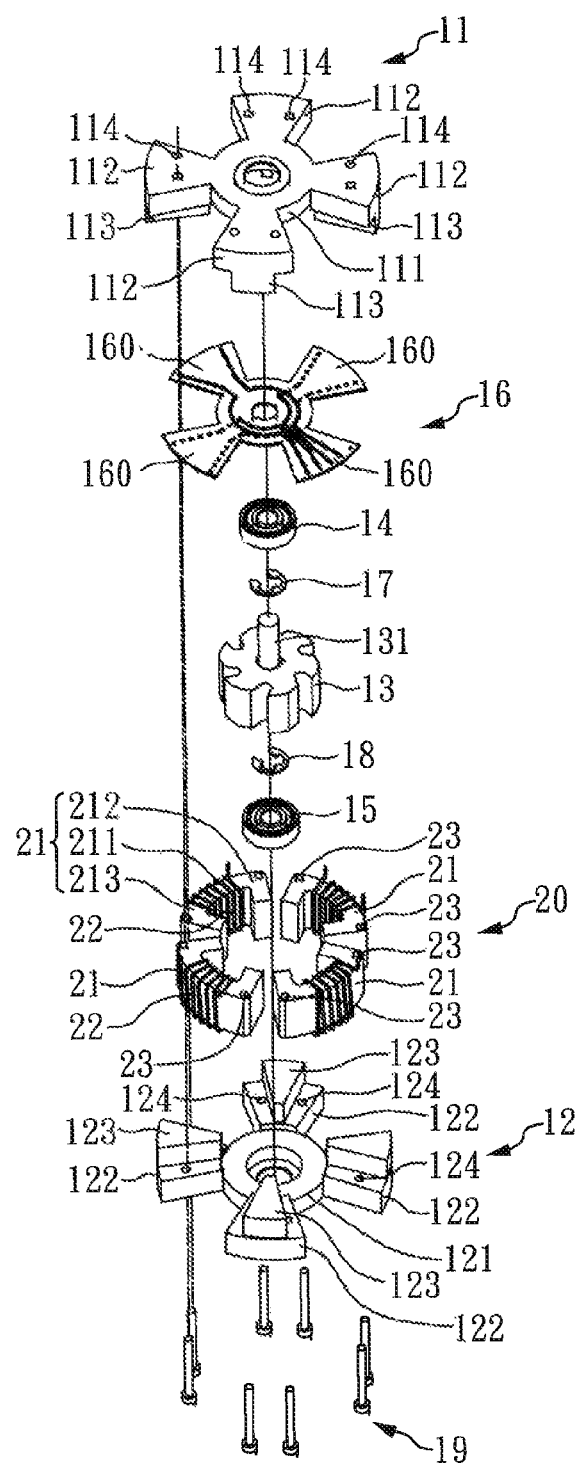
FIG. 1 is an exploded view of a motor assembly of a first embodiment of the present invention.
Figure 2:
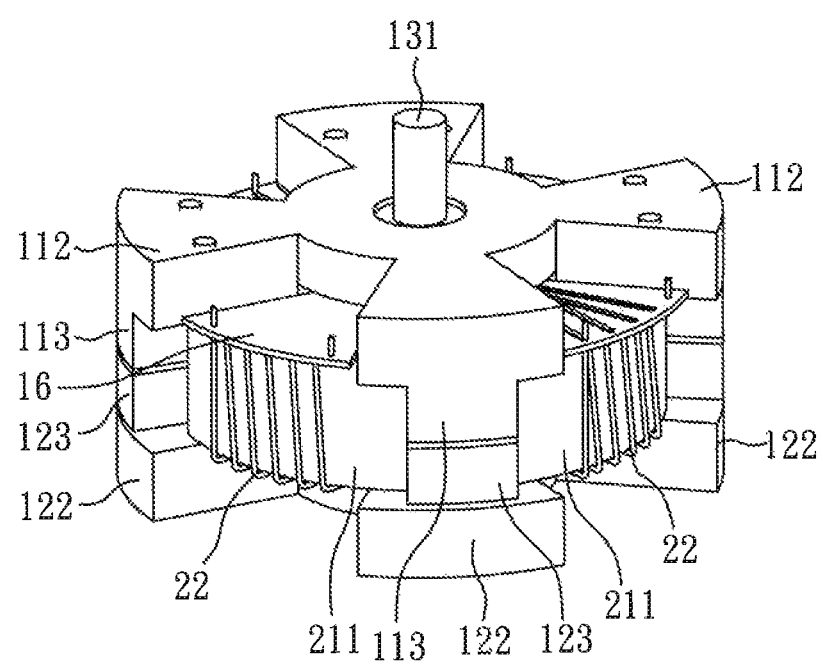
FIG. 2 is a perspective view of the motor assembly of the first embodiment of the present invention.
Figure 3:
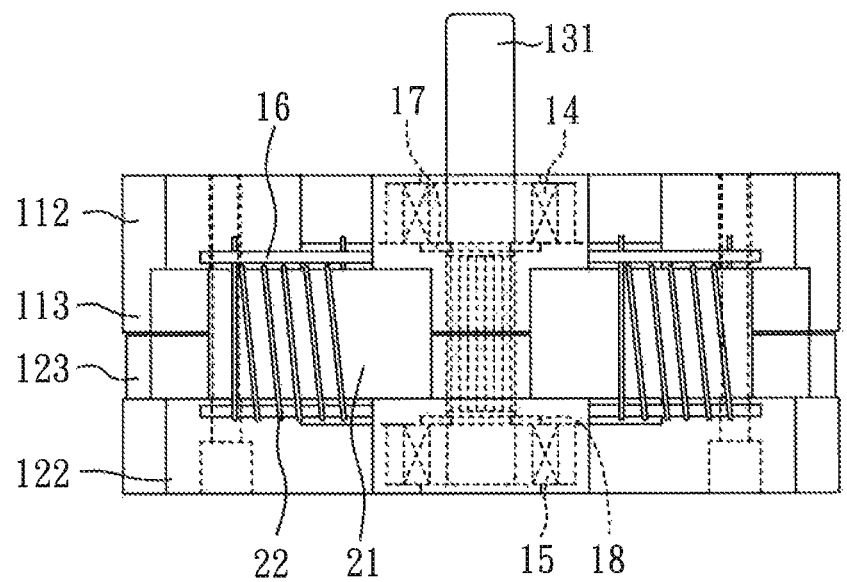
FIG. 3 is a sectional view of the motor assembly of the first embodiment of the present invention.
Figure 4:
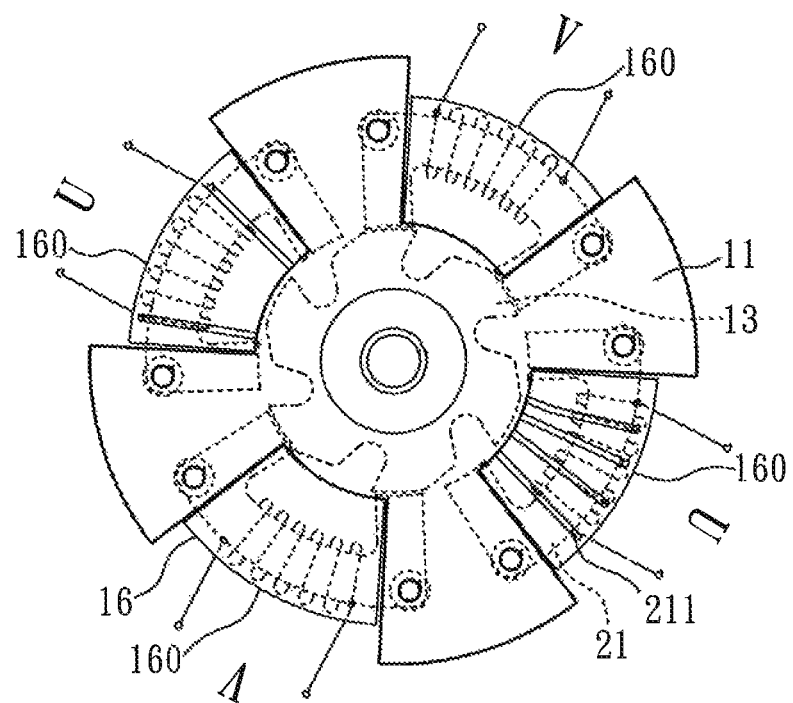
FIG. 4 is a top view of the motor assembly of the first embodiment of the present invention.

FIG. 1 is an exploded view of a motor assembly of a first embodiment of the present invention. FIG. 2 is a perspective view of the motor assembly of the first embodiment of the present invention. FIG. 3 is a sectional view of the motor assembly of the first embodiment of the present invention. FIG. 4 is a top view of the motor assembly of the first embodiment of the present invention. In this embodiment, the motor assembly of the present invention is for a switched-reluctance motor (SRM). The motor assembly has a first cap body 11, a second cap body 12, a rotor body 13, a circuit board 16, a stator body 20 and a fixing mechanism 19. Since the structure of the first cap body 11 is the same as that of the second cap body 12, the cost of mold manufacturing and design is reduced. In this embodiment, the fixing mechanism 19 is a plurality of bolts.

The first cap body 11 has a first bearing holder 111 and a plurality of first positioning portions 112. In this embodiment, four first positioning portions 112 are formed on the first cap body 11 separately. The first positioning portions 112 are substantially extension portions radially extended from the first bearing holder 111. Additionally, each first positioning portion 112 is formed as a sector, so that the outline of the first cap body 11 is cross-shaped with four rounded terminals. A first bearing 14 is received in the first bearing holder 111. At least one receiving slot 114 is recessed on each first positioning portion 112. In this embodiment, each first positioning portion 112 has two receiving slots 114 with threaded features inside.

Similarly, the second cap body 12 has a second bearing holder 121 and a plurality of second positioning portions 122 radially extended from the second bearing holder 121. In this embodiment, four second positioning portions 122 are formed on the second cap body 12 separately. A second bearing 15 is received in the second bearing holder 121. Each second positioning portion 122 has at least one receiving hole 124 opened therethrough. In this embodiment, two receiving holes 124 are opened on each second positioning portion 122, so that the number of the receiving holes 124 of each second positioning portion 122 equals to that of the receiving slots 114 of each first positioning portion 112.

Since the first positioning portions 112 and the second positioning portions 122 are separated with each other correspondingly, the manufacturing cost can be reduced because fewer materials are applied.

In addition, a first blocker 113 and a second blocker 123 are axially extruded from each first positioning portion 112 and each second positioning portion 122 respectively, so that the stator units of the stator body 20 are confined in the first blockers 113 or the second blockers 123, therefore, the stator body 20 are positioned stably whether the motor assembly is operating or not.

The center part of the rotor body 13 is passed through by a shaft 131, and two ends of the shaft 131 are sleeved in the first bearing 14 and the second bearing 15 respectively.

The stator body 20 has a plurality of stator units 21 aligned around an outer periphery of the rotor body 13 and a plurality of coils 22 winded on the stator units 21 respectively. Specially, each stator unit 21 has two feet 212, 213 and a connecting portion 211 connecting to the two feet 212, 213, so that the outline of each stator unit 21 is approximately formed as U-shaped. Here, each foot 212, 213 is an extruded pole of the stator body 20.

In this embodiment, the coil 22 is winded on the connecting portion 211 of the stator unit 21. In addition, the connecting portion 211 is approximately an arced plate, so that the outline of the stator body 20 is approximately rounded. Each stator unit 21 is axially sandwiched between each corresponding first positioning portion 112 and second positioning portion 122, and particularly each stator unit 21 is abutted against each corresponding first positioning portion 112 and second positioning portion 122 by the two feet 212, 213 respectively, with the connecting portion 211 being suspended.

Each stator unit 21 has at least one through hole 23 opened thereon. In this embodiment, each stator unit 21 has two through holes 23 corresponding to the number of the receiving slots 144 and that of the receiving holes 124.

The circuit board 16 is provided to control conduction states of the motor assembly and is axially sandwiched between the stator body 20 and the first cap body 11, but embodiments of the present invention are not limited thereto, in some embodiments, the circuit board 16 is axially sandwiched between the stator body 20 and the second cap body 12. In this embodiment, the circuit board 16 has a plurality of extruding portions 160 formed thereon. And, the circuit board 16 is formed as a cross-shaped feature with rounded edge, so that after assembling, each extruding portion 160 of the circuit board 16 is partially exposed between each two corresponding first positioning portions 112 of the first cap body 11, as shown in FIG. 4.

The circuit board 16 is electrically connected to each coil 22. The conduction states of the coils 22 with different phases are changed uniformly so as to generate a reluctant torque for moving the rotor body 13.

In order to prevent the first bearing 14 and the second bearing 15 from unnecessary axial movement, two E-shaped fasteners 17, 18 are provided to abut against the two bearings 14, 15 respectively, so that the first bearing 14 and the second bearing 15 are limited in the first bearing holder 111 and the second bearing holder 121 respectively.

After the components mentioned above are positioned, the first cap body 11, the stator body 20 and the second cap body 12 are axially fixed by the fixing mechanism 19. In this embodiment, the fixing mechanism 19 is a plurality of bolts. The bolts are respectively passed through the receiving holes 124, the through holes 23 in order so as to lock into the receiving slots 114, so that the first positioning portions 112, the stator units 21 and the second positioning portions 122 are securely and closely fastened. Alternatively, in some embodiments, each receiving slot 114 of the first cap body 11 is designated as a via hole, so that each bolt is passed through each corresponding via hole so as to closely fasten the first cap body 11, the stator body 20 and the second cap body 12 with a nut. In some embodiments, rivets are applied for fastening.

According to the descriptions of the present invention mentioned above, the characteristics of the present invention are narrated as following: Firstly, as compared to prior arts, the flexibility for designing the stator body 20 is wider, so that the stator body 20 can be designated to meet different market requirements. Second, the coil winding procedure for the motor assembly is simpler and faster. Third, the procedure of assembling the motor assembly is more convenient. Fourthly, the components inside the motor assembly are well fastened and positioned. Fifthly, the manufacturing cost of the motor assembly is reduced.

Figure 15:
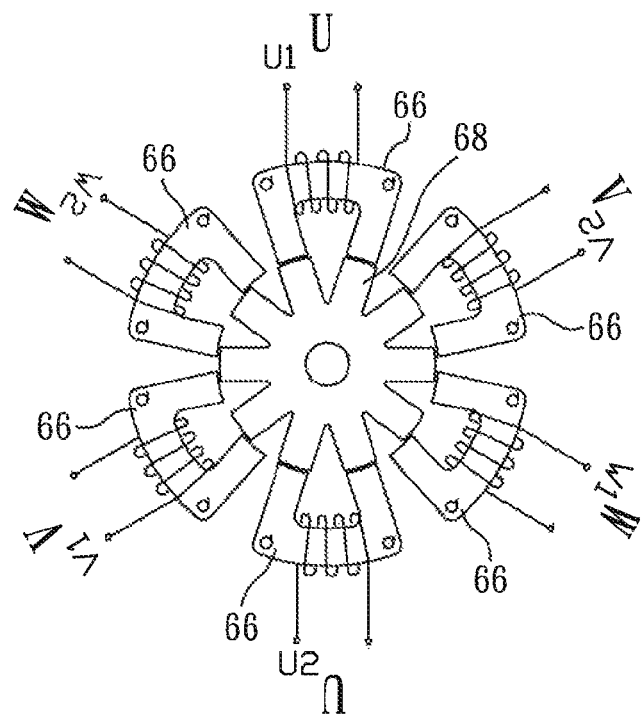
FIG. 15 is a schematic view for showing the present invention is applied to a three phase switched-reluctance motor.
Figure 16:
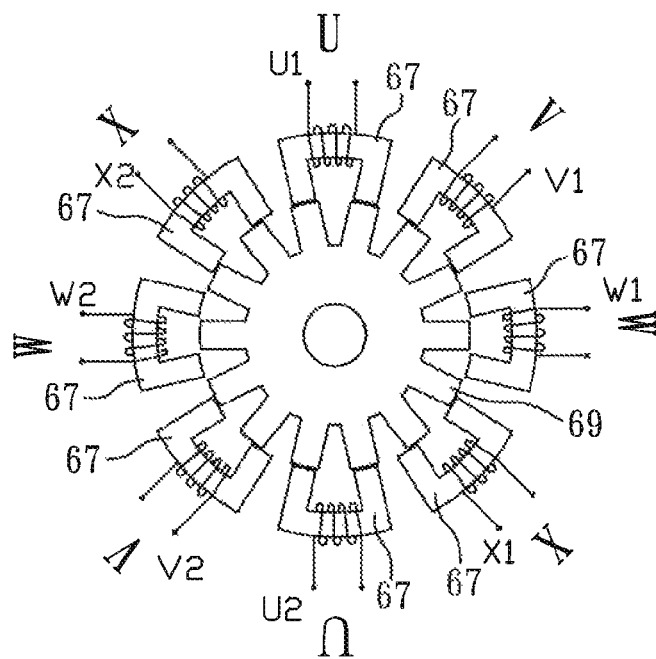
FIG. 16 is a schematic view for showing the present invention is applied to a four phase switched-reluctance motor.

FIG. 4 is an example showing a two phase switched-reluctance motor and the mechanism of the two phase switched-reluctance motor is described as following. Initially, the coils 22 on the stator units 21 with U phase are magnetized so as to generate an attractive magnetic force (namely, the detent force), so that the rotor body 13 is rotated clockwise or counterclockwise by a certain angle; thereby, after the rotor body 13 is rotated by the certain angle, the coils 22 on the stator units 21 with V phase are magnetized, so that the rotor body 13 is further rotated by the certain angle. Therefore, via controlling the phase switching electrically, the coils 22 with U phase and the coils 22 with V phase are alternatively magnetized, so that the rotor body 13 is rotated continuously because of the attractive magnetic force. The mechanism of other multi phase switched-reluctance motors is similar to that of the two phase switched-reluctance motor as mentioned above. Please refer to FIGS. 15 and 16, which are examples for showing the present invention applied to a three phase switched-reluctance motor and a four phase switched-reluctance motor respectively, wherein the cooperating principles between the rotor body 68, 69 and the stator body 66, 67 for the three phase switched-reluctance motor and the four phase switched-reluctance motor are similar to that for the two phase switched-reluctance motor in FIG. 4, so that the similarities between above embodiments are omitted.

Figure 5:
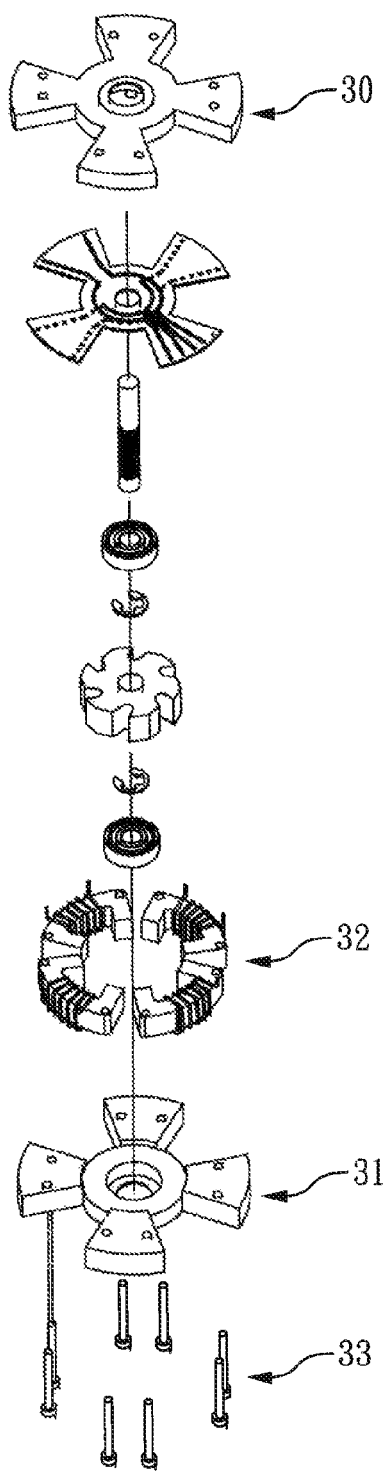
FIG. 5 is an exploded view of a motor assembly of a second embodiment of the present invention.
Figure 6:
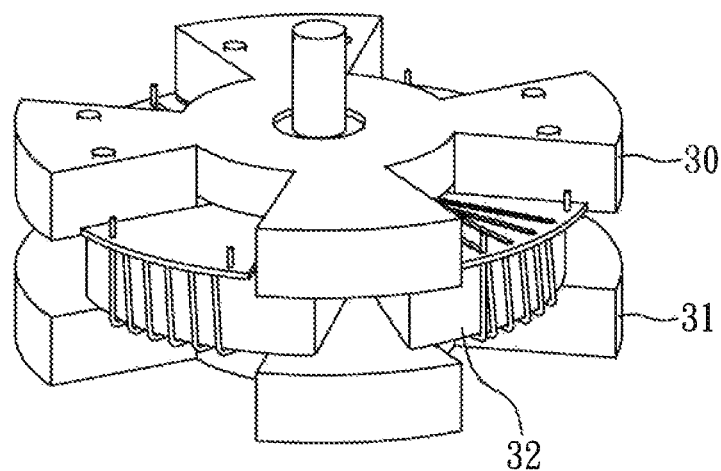
FIG. 6 is a perspective view of the motor assembly of the second embodiment of the present invention.

FIG. 5 is an exploded view of a motor assembly of a second embodiment of the present invention. FIG. 6 is a perspective view of the motor assembly of the second embodiment of the present invention. The motor assembly of the second embodiment is approximately the same as that of the first embodiment, except that neither the first cap body 30 nor the second cap body 31 has a blocker in the second embodiment. In this embodiment, the fixing mechanism 33 provides enough strength for securing the first cap body 30, the second cap body 31 and the stator body 32 so that the motor assembly provides enough stability for operation.

Figure 7:
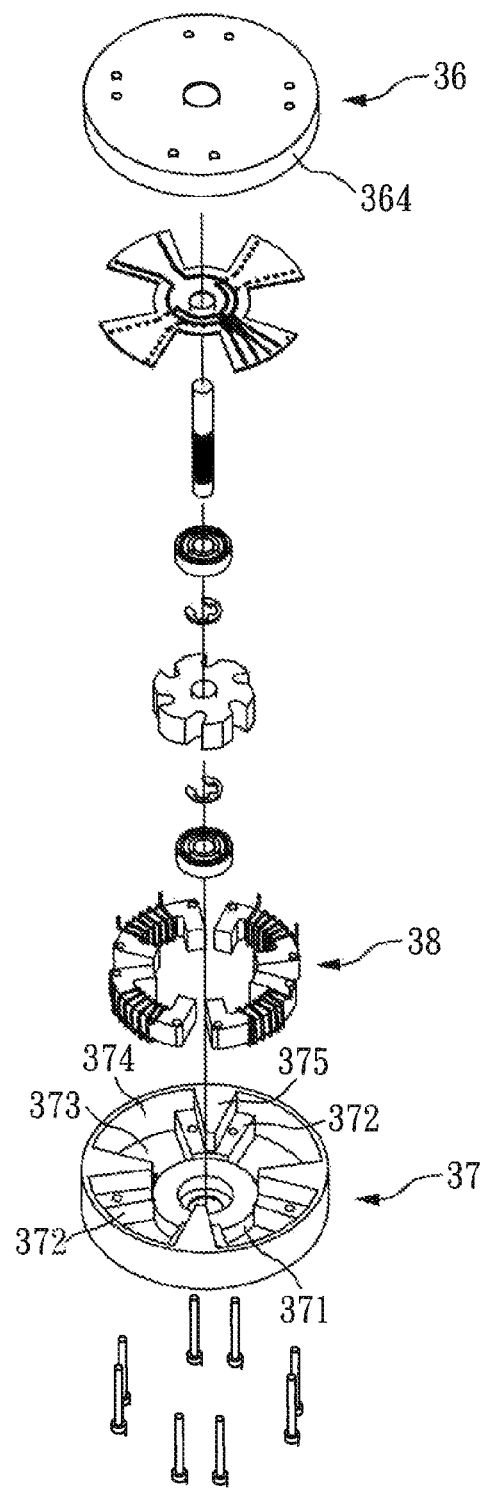
FIG. 7 is an exploded view of a motor assembly of a third embodiment of the present invention.
Figure 8:
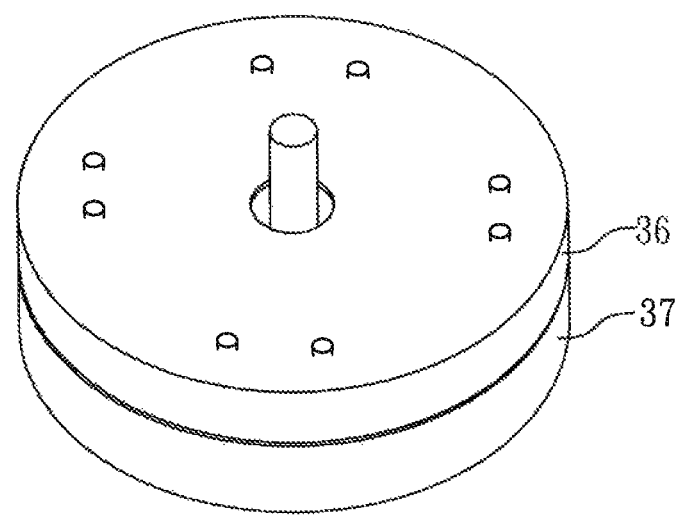
FIG. 8 is a perspective view of the motor assembly of the third embodiment of the present invention.

FIG. 7 is an exploded view of a motor assembly of a third embodiment of the present invention. FIG. 8 is a perspective view of the motor assembly of the third embodiment of the present invention. The motor assembly of the third embodiment is approximately the same as that of the first embodiment, except that the structure of the first cap body 36 and the second cap body 37 in the third embodiment are different from that in the first embodiment. In the third embodiment, the structure of the first cap body 36 is the same as that of the second cap body 37. The second cap body 37 has a second bearing holder 371, a plurality of second positioning portions 372, wherein a second blocker 375 is extruded axially from each second positioning portion 372. Particularly, each two adjacent second positioning portions 372 are connected via a bottom joint portion 373 so as to connect with each other. The second cap body 37 additionally has a second outer wall 374 axially extended from the second cap body 37 so as to enclose the second positioning portions 372, so that the second cap body 372 is approximately formed as bowled-shape. When the stator body 38 is sandwiched between the first cap body 36 and the second cap body 37, a first outer wall 364 of the first cap body 36 and the second outer wall 374 of the second cap body 37 are combined together so as to enclose the stator body 38. In this embodiment, the stator body 38 is enclosed inside the first cap body 36 and the second cap body 37, so that a basic function for waterproof and dustproof is provided. In addition, if additionally sealing steps are applied, such as a soldering step or a rubber layer coating step, the waterproof and dustproof performance of the present invention would be much better.

Figure 9:
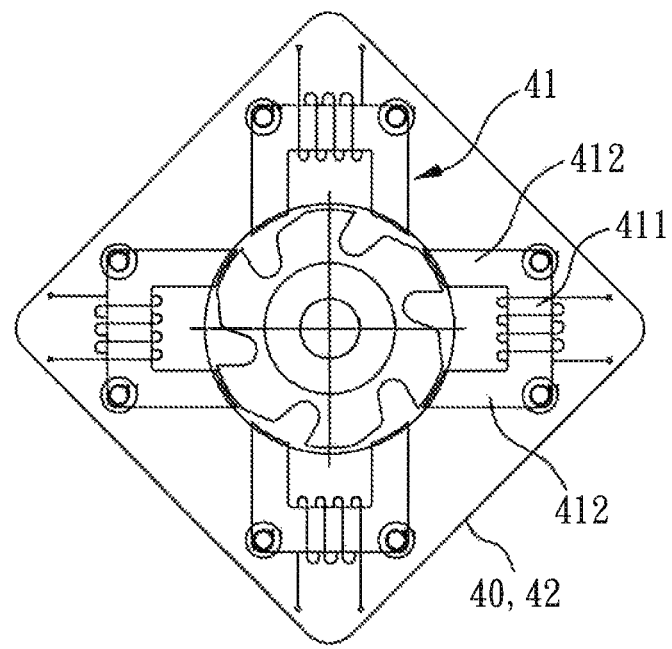
FIG. 9 is a top view of a motor assembly of a fourth embodiment of the present invention.
Figure 10:
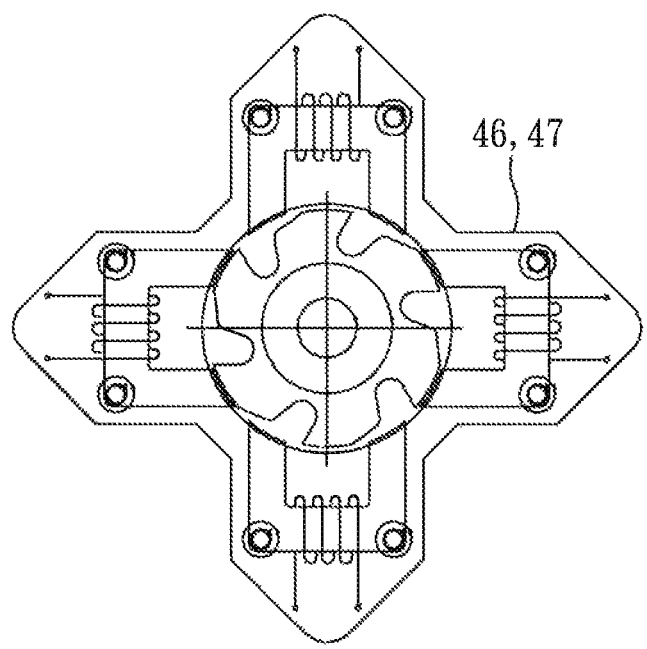
FIG. 10 is a top view of a motor assembly of a fifth embodiment of the present invention.

FIG. 9 is a top view of a motor assembly of a fourth embodiment of the present invention. FIG. 10 is a top view of a motor assembly of a fifth embodiment of the present invention. The motor assembly of the fourth embodiment and the fifth embodiment are approximately the same as that of the first embodiment, except that the first cap body 40, the second cap body 42 and the stator units 41 in the fourth or fifth embodiment are different from that in the first embodiment. Please refer to FIG. 9, in which the motor assembly of the fourth embodiment of the present invention shows the first cap body 40 and the second cap body 42 are diamonded-shape, and each stator unit 41 has a stripe connecting portion 411 for forming a U-shaped outline with the two feet 412, FIG. 10 shows that the first cap body 46 and the second cap body 47 are crosses with sword-like terminals.

Figure 11:
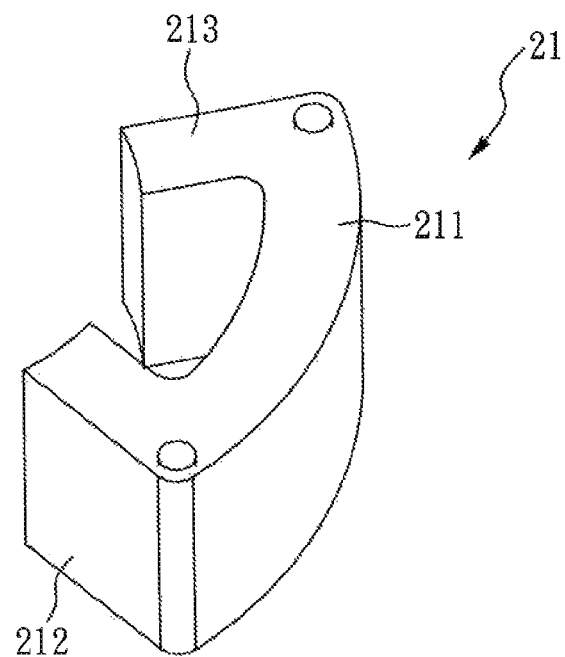
FIG. 11 is an enlarged view for showing a stator unit of the first embodiment of the present invention.
Figure 12:
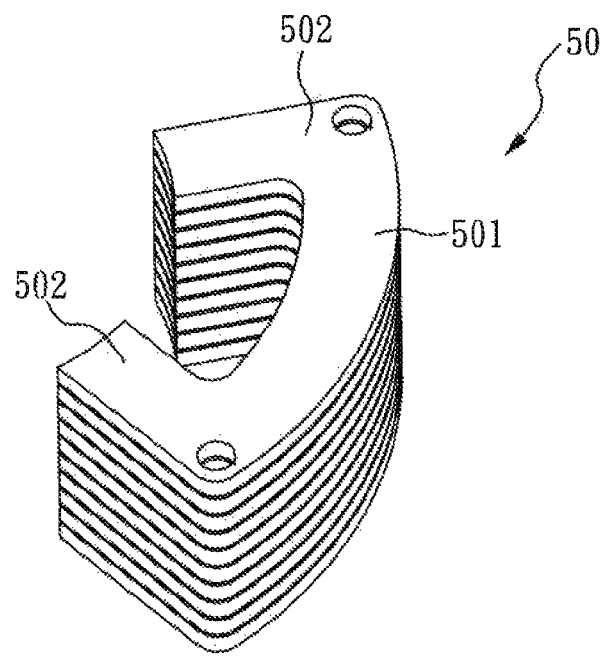
FIG. 12 is an enlarged view for showing the stator unit of the first embodiment of the present invention, wherein a plurality of silicon steel plates is stacked to form the stator unit.

FIG. 11 is an enlarged view for showing the stator unit 21 of the first embodiment of the present invention. In this embodiment, the stator unit 21, the connecting portion 211 and the two feet 212, 213 are formed as one-piece. FIG. 12 shows another stator unit 50 of the present invention, in which a connecting portion 501 and two feet 502 are integrally formed as a silicon steel plate, so that a plurality of silicon steel plates is stacked axially to form the stator unit 50.

Figure 13:
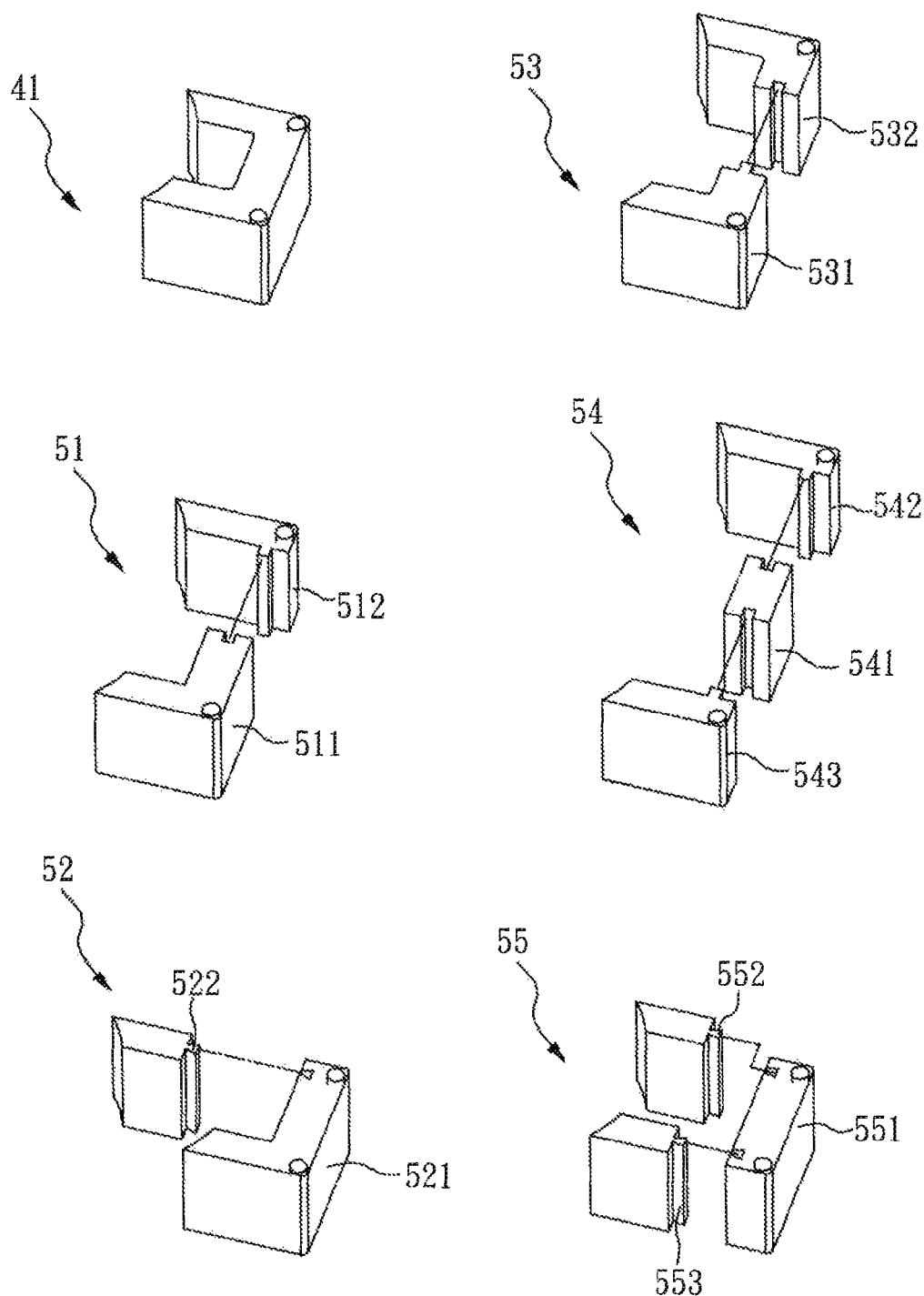
FIG. 13 is a schematic view for showing the stator units of the motor assembly of the present invention are composed of a plurality of sub stator units.
Figure 14:
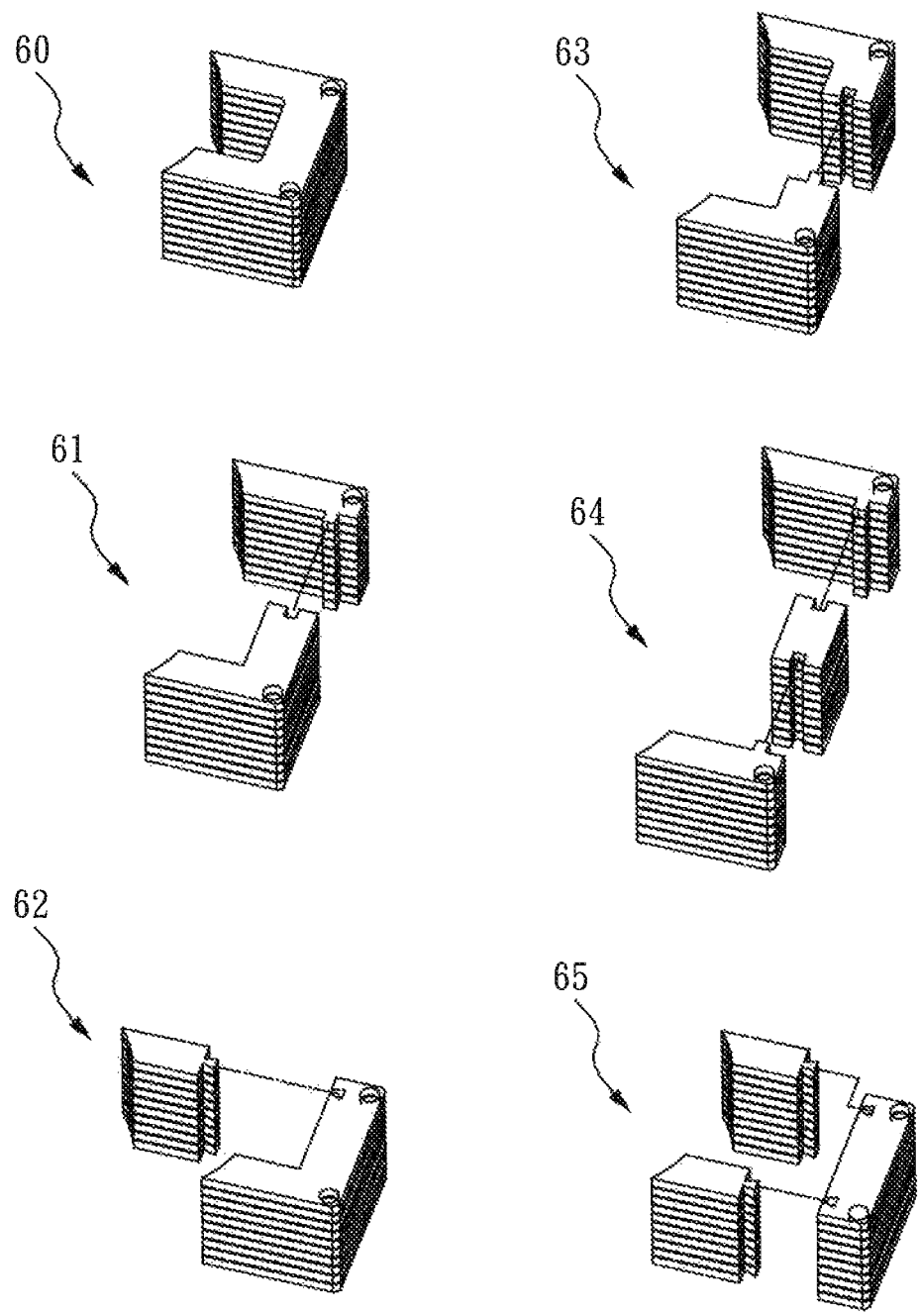
FIG. 14 is an enlarged view for showing the stator units of the motor assembly of the present invention are composed a plurality of sub stator units, wherein a plurality of silicon steel plates is stacked to form each sub stator unit.

Please refer to FIGS. 13-14, in which the other embodiments of the stator units are shown. Please refer to FIG. 13, in which the stator unit 41 of the fourth embodiment is shown, which is similar to the stator unit 21 shown in FIG. 11. The stator unit 51 is formed by securely engaging two separated sub stator units 511, 512, wherein one of the two sub stator units 511, 512 is integrally formed by a foot and a connecting portion, another of the two sub stator units 511, 512 is another foot. Similarly, the stator unit 52 is formed by engaging two sub stator units 521, 522, and the stator unit 53 is also formed by engaging two sub stator units 531, 532; however, the structures of the sub stator units 521, 522, 531, 532 between the two embodiments are not the same. The sub stator unit 54 is formed by engaging three sub stator units 541, 542, 543, and the sub stator unit 55 is also formed by engaging three sub stator units 551, 552, 553, however, the structures of the sub stator units 541, 542, 543, 551, 552, 553 between the two embodiments are not the same.

Figure 17:
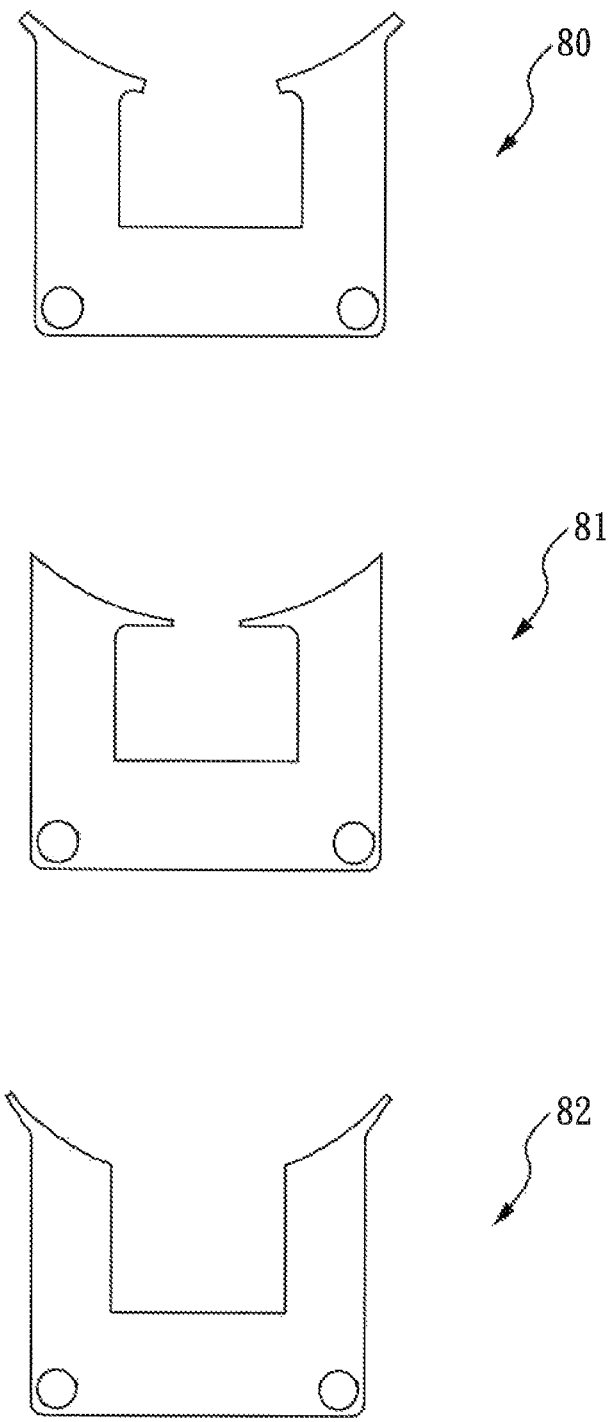
FIG. 17 is a schematic view for showing the other stator units of the motor assembly of the present invention.

Please refer to FIG. 14, in which the stator units 60, 61, 62, 63, 64, 65 corresponding to the stator units 50, 51, 52, 53, 54, 55 in FIG. 13 are formed by stacking silicon steel plates axially. Ordinary skill in the art should realize and be capable of embodying all the stator units shown in the FIGS of the present invention. Additionally please refer to FIG. 17, in which stator units 80, 81, 82 with different shapes are shown.

Figure 18:
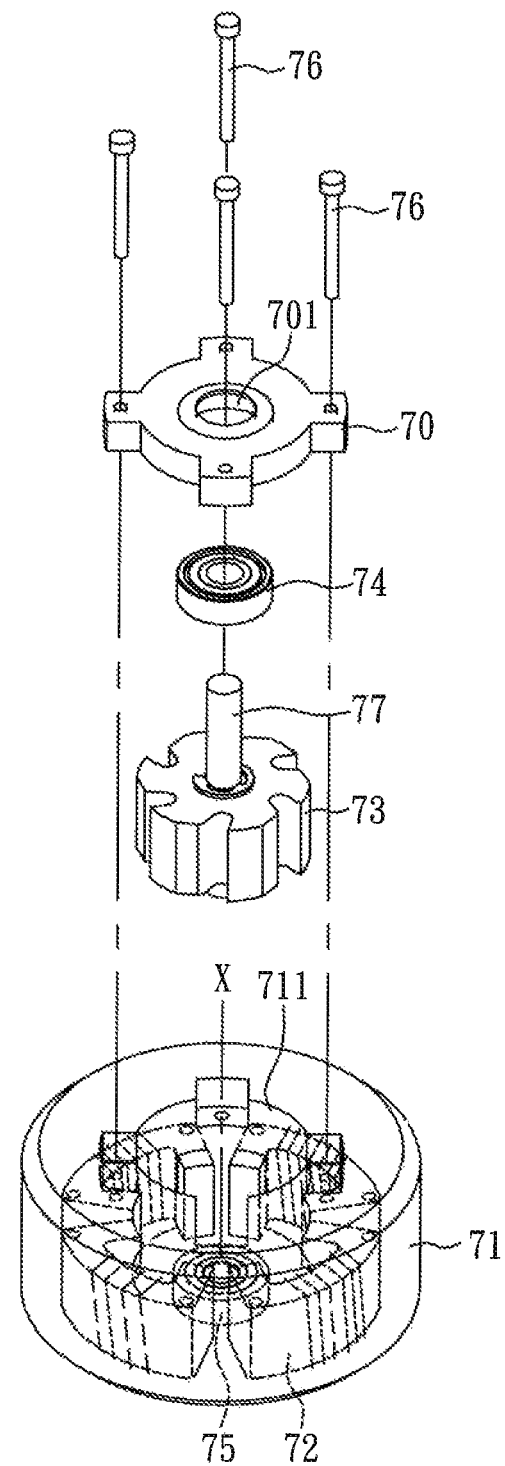
FIG. 18 is an exploded view of a motor assembly of a sixth embodiment of the present invention.
Figure 19:
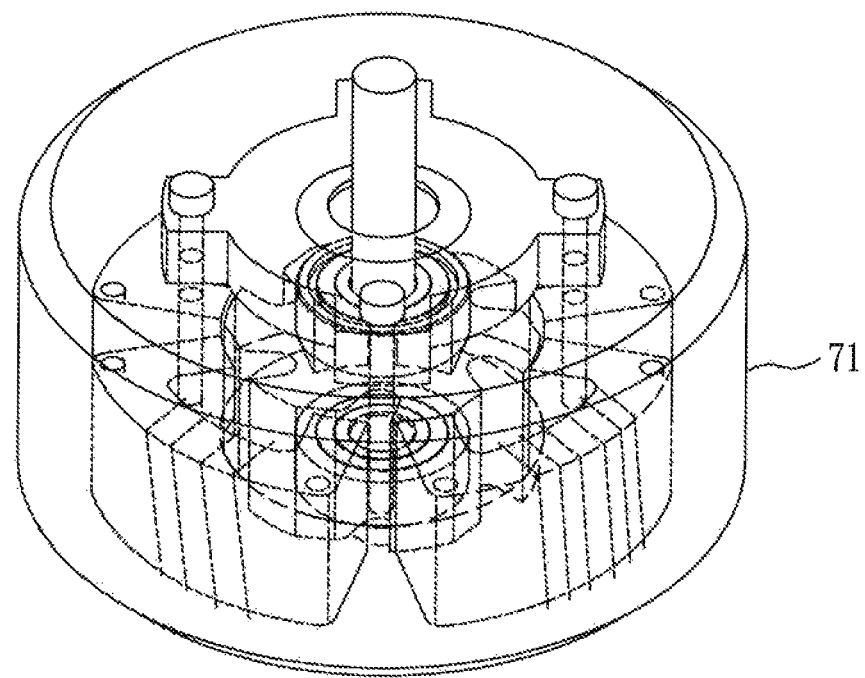
FIG. 19 is a perspective view of the motor assembly of the sixth embodiment of the present invention.

FIG. 18 is an exploded view of a motor assembly of a sixth embodiment of the present invention. FIG. 19 is a perspective view of the motor assembly of the sixth embodiment of the present invention. The motor assembly of the sixth embodiment of the present invention has a main cap body 70, a motor body 71, a stator body 72, a rotor body 73 with a shaft 77 passing through, a first bearing 74, a second bearing 75 and a fixing mechanism 76. The motor body 71 is made of plastic or resin and formed as one piece, wherein the stator body 72 and the second bearing 75 are enclosed in the motor body 71.

The motor body 71 has an opening 711 disposed on one side thereof, so that the rotor body 73 is placed into the motor body 71 via the opening 711. The main cap body 70 has a first bearing holder 701 for receiving the first bearing 74. The structures of the stator body 72 and the rotor body 73 in the sixth embodiment of the present invention are approximately the same as that in the first embodiment. Four stator units of the stator body 72 are aligned circularly so as to define a central axis X, and the rotor body 73, the first bearing 74 and the second bearing 75 are assembled coaxially to the central axis X.

The assembling of the motor assembly of this embodiment is described as below. Initially the main cap body 70 assembled with the first bearing 74 is combined to the motor body 71 via the opening 711; and then, the fixing mechanism 76, such as a plurality of bolts, is provided for fastening the main cap body 70 with the motor body 71 axially.

Figure 20:
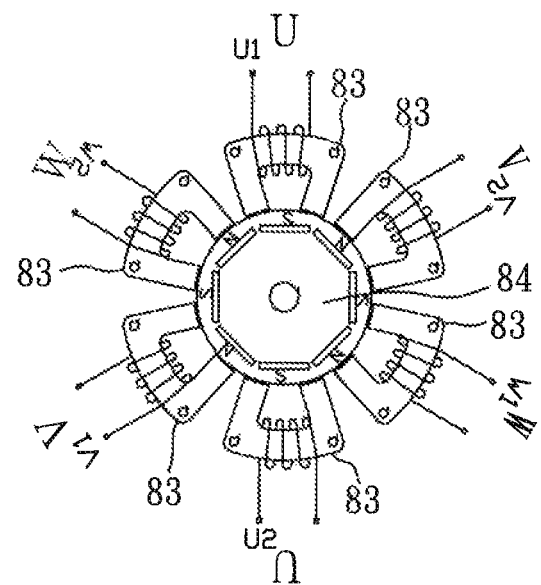
FIG. 20 is a schematic view for showing the rotor body and the stator body of the present invention which is applied to a three phase brushless DC motor.
Figure 21:
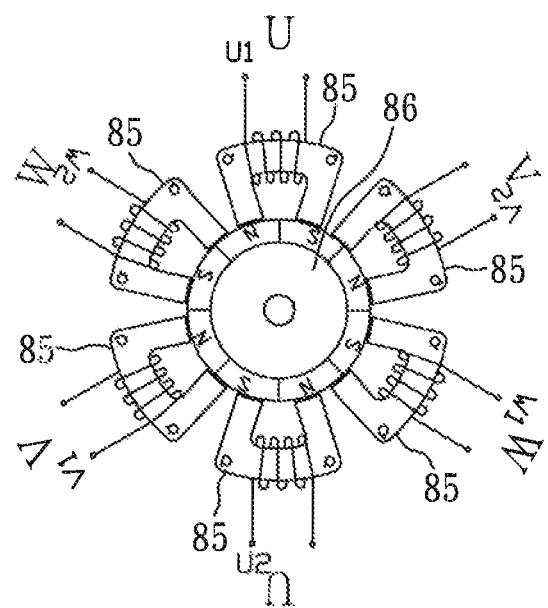
FIG. 21 is a schematic view for showing the rotor body and the stator body of the present invention which is applied to another three phase brushless DC motor.

Besides application to switched-reluctance motors, the present invention is also applicable to brushless DC motors. To accomplish a brushless DC motor, a rotor with a permanent magnet is placed into the stator body of the switched-reluctance motor mentioned above. FIG. 20 is a schematic view for showing the rotor body and the stator body of the present invention which is applied to a three phase brushless DC motor. FIG. 21 is a schematic view for showing the rotor body and the stator body of the present invention which is applied to another three phase brushless DC motor. The mechanism of the brushless DC motor is described as following. Initially, the coils on the stator units 83 with U phase and V phase are magnetized so as to generate an attractive magnetic force (a permanent magnetic force), and a repulsive magnetic force (a detent force), between the stator body and the rotor body 84, so that the rotor body 84 is rotated clockwise or counterclockwise by a certain angle; and then, the coils on the stator units 83 with U phase and W phase are magnetized, so that the rotor body 84 is additionally rotated by the certain angle; then, the coils on the stator units 83 with W phase and V phase are magnetized, so that the rotor body 84 is additionally rotated by the certain angle; additionally, the coils on the stator units 83 with U phase and V phase are magnetized, so that the rotor body 84 is additionally rotated by the certain angle; then, the coils on the stator units 83 with U phase and W phase are magnetized, so that the rotor body 84 is additionally rotated by the certain angle; additionally, the coils on the stator units 83 with V phase and W phase are magnetized, so that the rotor body 84 is additionally rotated by the certain angle. Therefore, because the magnetization of the coils is continuously alternated, the rotor body 84 is rotated continuously because of the attractive force and the repulsive force. The mechanism of other single phase, two phase or multi phase brushless DC motors is similar to that of the three phase brushless DC motor as mentioned above. Please refer to FIGS. 20-21, in which the rotor bodies between the two embodiments are different.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A motor assembly, comprising:
  a first cap body, comprising a first bearing holder and a plurality of first positioning portions radially extended from the first bearing holder, a first bearing received in the first bearing holder;
  a second cap body, comprising a second bearing holder and a plurality of second positioning portions radially extended from the second bearing holder, a second bearing received in the second bearing holder;
  a rotor body, having a shaft passing through a center part thereof, two ends of the shaft sleeved in the first bearing and the second bearing respectively;
  a stator body, comprising a plurality of stator units aligned around an outer periphery of the rotor body and a plurality of coils winded on the stator units respectively, each stator unit having two feet and a connecting portion connecting to the two feet, each stator unit being formed as U-shaped, the stator units axially sandwiched between first positioning portions and second positioning portions; and a fixing mechanism, axially fixing the first cap body, the stator body and the second cap body;

wherein a first blocker is axially extruded from each first positioning portion, so that each stator unit is confined in each corresponding two adjacent first blockers.

2. The motor assembly according to claim 1, wherein second first blocker is axially extruded from each second positioning portion, so that each sub unit of the stator body is confined in each corresponding two adjacent second blockers.

3. The motor assembly according to claim 1, wherein a circuit board is axially sandwiched between the stator body and the first cap body, the circuit board is electrically connected to the coils, the circuit board comprises a plurality of extruding portions radially and respectively exposed between the first positioning portions of the first cap body.

4. The motor assembly according to claim 1, wherein the first cap body and the second cap body have a first outer wall and a second outer wall respectively and axially extended from the first cap body and the second cap body, so that the first cap body and the second cap body are formed as bowled-shape, and the first outer wall and the second outer wall are combined together so as to enclose the stator body.

5. The motor assembly according to claim 1, wherein the two feet and the connecting portion of each stator unit are engaged with each other.

6. The motor assembly according to claim 1, wherein the two feet and the connecting portion of each stator unit are integrally formed as one piece.

7. The motor assembly according to claim 1, wherein the fixing mechanism comprises a plurality of bolts passing through the second positioning portions, the stator units and the first positioning portions respectively so as to closely and axially fasten the first cap body, the stator body and the second cap body.

8. The motor assembly according to claim 1, wherein the motor assembly is selected from a switched-reluctance motor and a brushless DC motor.

9. A motor assembly, comprising:

a first cap body, comprising a first bearing holder and a plurality of first positioning portions radially extended from the first bearing holder, a first bearing received in the first bearing holder;

a second cap body, comprising a second bearing holder and a plurality of second positioning portions radially extended from the second bearing holder, a second bearing received in the second bearing holder;

a rotor body, having a shaft passing through a center part thereof, two ends of the shaft sleeved in the first bearing and the second bearing respectively;

a stator body, comprising a plurality of stator units aligned around an outer periphery of the rotor body and a plurality of coils winded on the stator units respectively, each stator unit having two feet and a connecting portion connecting to the two feet, each stator unit being formed as U-shaped, the stator units axially sandwiched between first positioning portions and second positioning portions;

a fixing mechanism, axially fixing the first cap body, the stator body and the second cap body; and a circuit board is axially sandwiched between the stator body and the first cap body, the circuit board is electrically connected to the coils, the circuit board comprises a plurality of extruding portions radially and respectively exposed between the first positioning portions of the first cap body.

10. The motor assembly according to claim 9, wherein second first blocker is axially extruded from each second positioning portion, so that each sub unit of the stator body is confined in each corresponding two adjacent second blockers.

11. The motor assembly according to claim 9, wherein the first cap body and the second cap body have a first outer wall and a second outer wall respectively and axially extended from the first cap body and the second cap body, so that the first cap body and the second cap body are formed as bowled-shape, and the first outer wall and the second outer wall are combined together so as to enclose the stator body.

12. The motor assembly according to claim 9, wherein the two feet and the connecting portion of each stator unit are engaged with each other.

13. The motor assembly according to claim 9, wherein the two feet and the connecting portion of each stator unit are integrally formed as one piece.

14. The motor assembly according to claim 9, wherein the fixing mechanism comprises a plurality of bolts passing through the second positioning portions, the stator units and the first positioning portions respectively so as to closely and axially fasten the first cap body, the stator body and the second cap body.

15. The motor assembly according to claim 9, wherein the motor assembly is selected from a switched-reluctance motor and a brushless DC motor.

\* \* \* \* \*